INVENTORS
Fumio Ide
Seiji Deguchi
BY Robert R. Priddy
ATTORNEY

United States Patent Office 3,591,657
Patented July 6, 1971

3,591,657
BLENDING RESIN AND HIGH TRANSPARENCY HIGH IMPACT STRENGTH VINYL CHLORIDE POLYMER BLENDS CONTAINING SAME
Fumio Ide and Seji Deguchi, Hiroshima, Japan, assignors to Mitsubishi Rayon Co., Ltd., Tokyo, Japan
Filed July 19, 1968, Ser. No. 746,024
Claims priority, application Japan, July 28, 1967, 42/48,571
Int. Cl. C08f 29/24, 41/12; C08d 9/08
U.S. Cl. 260—876R    6 Claims

ABSTRACT OF THE DISCLOSURE

A resinous additive containing a styrene, n-butyl acrylate and butadiene-1,3 elastomer in admixture with a copolymerizate of styrene and methyl methacrylate and/or acrylonitrile. Vinyl chloride polymer compositions containing this resinous additive and having both excellent transparency and impact resistance.

BACKGROUND OF THE INVENTION

Vinyl chloride polymers are generally inexpensive and have excellent chemical and physical properties. Thus they are produced commercially on a large scale for many widely varying uses. Unfortunately, the resins formed from these polymers are somewhat inferior in impact strength as compared with other known resins. On the other hand, vinyl chloride resins are superior to such other resins in transparency. It has been suggested that the impact resistance of polyvinyl chloride resins could be improved by blending them with natural or synthetic rubber, or with a resin obtained by grafting styrene, acrylonitrile, methyl methacrylate or the like onto a rubbery polymer. ABS (acrylonitrile-butadiene-styrene resin, or modified resins including methyl methacrylate or the like) prepared by grafting styrene and acrylonitrile onto poly-butadiene or styrene-butadiene rubber is a particularly effective polymeric additive for improving the impact resistance of PVC (polyvinyl chloride resin). Lamentably, blends of ABS with PVC are generally inferior in transparency to PVC alone.

Reportedly, this problem of poor transparency can be reduced somewhat by careful control over the process for preparing the ABS. Thus, when polybutadiene is employed as the backbone of the ABS, its particle size should be as small as possible, its gel content (weight percent insoluble in toluene) should be as high as possible and its swelling index should be low. Also, when styrene-butadiene rubber is employed as the backbone of the ABS, its particle size should be small. Further, when either polybutadiene or styrenebutadiene rubber serves as the backbone of the ABS, the types and combinations of monomers which can be grafted onto the elastomer are quite restricted. Because of the foregoing, it has been a difficult problem to prepare PVC compositions characterized by both excellent transparency and high impact resistance. The principal object of the invention is to solve this problem. The nature of the invention and the manner of using it will be evident upon consideration of the following description and accompanying drawings in conjunction with the background knowledge possessed by those of ordinary skill in the art.

BRIEF SUMMARY OF THE INVENTION

Figure 1:
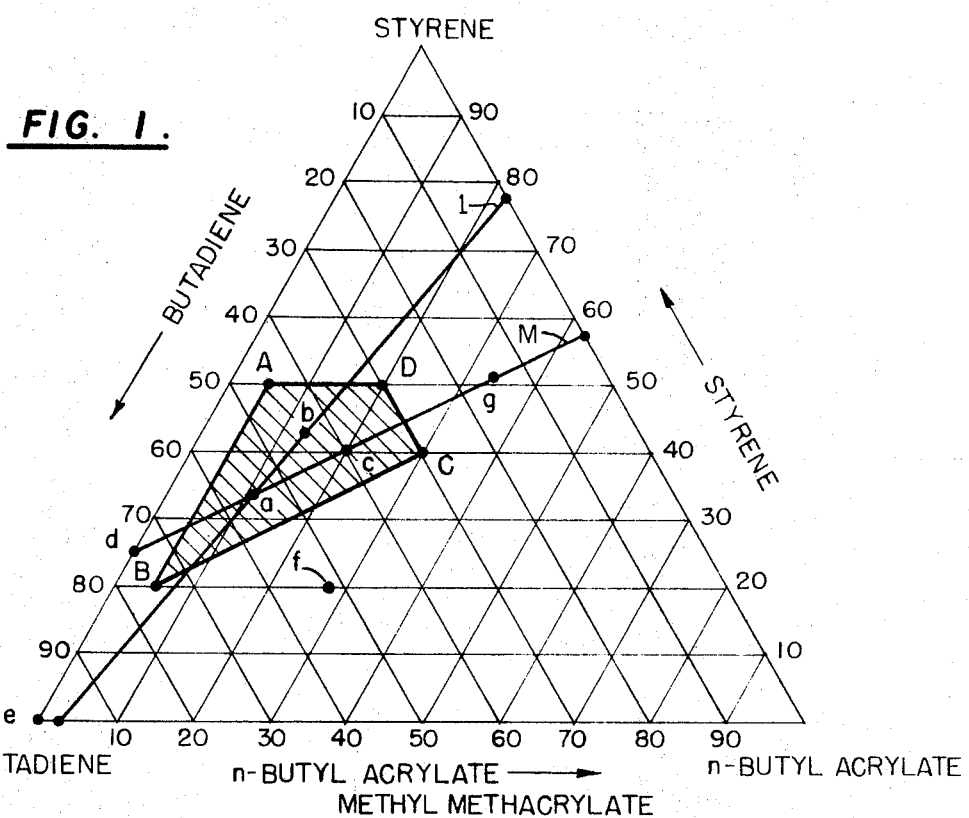
FIG. 1 is a ternary constitutional diagram of a styrene, n-butyl acrylate and a butadiene-1,3 elastomer.

It has been found that vinyl chloride polymer compositions having excellent impact resistance as well as excellent transparency can be prepared by blending vinyl chloride polymers with a resinous additive. This resinous additive consists essentially of about 20 to about 70% by weight of an elastomer of styrene, n-butyl acrylate and butadiene-1,3 and about 80 to about 30% of a copolymerizate of styrene and a member from the group consisting of methyl methacrylate, acrylonitrile and mixtures thereof. The elastomer has a composition defined by a point falling in the area ABCD of FIG. 1, while the copolymerizate has a composition defined by a point falling in the area EFGHIJ of FIG. 2. The copolymerizate of styrene, methyl methacrylate and/or acrylonitrile is present in the additive in intimate admixture with the elastomer. By this it is meant that the polymeric chains of the copolymerizate are thoroughly and homogeneously distributed about among the polymeric molecules of the elastomer, regardless of whether the copolymerizate polymer chains are chemically linked with preformed elastomer molecules, as by grafting, or are only partly so linked or not at all. The vinyl chloride polymer compositions of the present invention are homogeneous blends of the above-described resinous additive and a vinyl chloride polymer which may be polyvinyl chloride or a copolymer of vinyl chloride with a minor amount of another monomer copolymerizable therewith, including for example copolymers of at least about 70 to about 99.8% by weight of vinyl chloride and from about 0.2% to about 30% of at least one monomer from the group vinyl bromide, vinylidene chloride, vinyl acetate, acrylic acid and methacrylic acid. Advantageously the vinyl chloride polymer is a co-polymer consisting essentially of 70–97% by weight vinyl chloride and 3–30% by weight vinyl acetate.

THEORETICAL EXPLANATION OF CERTAIN ADVANTAGES OF THE INVENTION

As previously indicated, styrene-butadiene rubber or SBR, as it is sometimes called, is sometimes used as a backbone polymer in forming ABS resins which may in turn be blended with PVC to improve its impact resistance. When styrene and butadiene monomers are polymerized in an emulsion system to form SBR, the manner of distribution of the styrene and butadiene in the resultant polymer chains is found to change markedly as the addition polymerization reaction proceeds, so that a range of different types of molecules of varying composition (between the extremes of styrene and butadiene homopolymers) are formed. Polymers of poor transparency result. Contrariwise, it appears that an emulsion polymerization of monomers in a weight ratio defined by any point within area ABCD of FIG. 1 takes place with little or no change in the distribution of the monomers in the polymer chains formed at various stages of the reaction between the start and 100% conversion. This is especially true of polymers formed from monomer mixtures having a composition defined by a point on the line 1 of FIG. 1. It has also been found that polymers formed from monomer mixtures having a composition defined by a point on the line $m$ of FIG. 1 have an index of refraction like that of a vinyl chloride resin such as PVC. Without the intention of being bound by any theory, it is suggested that the resinous additive used in the present invention draws its high transparency from the fact that the elastomer employed therein is prepared by polymerizing the particular monomers in ratios which result in their uniform distribution in the resultant polymer in a manner which imparts thereto a favorable refractive index. Thus it appears that for purposes of producing an elastomer for use in a resinous additive for blending with PVC, where highest transparency is desired, the maintenance of a monomer concentration corresponding to a point $a$ in FIG. 1 would be considered optimum. Accordingly, as may be observed from FIG. 1, elastomers which are copolymers consisting essentially of 55–60% by weight 1,3-butadiene, 8–13% by weight n-butyl acrylate, and 30–38% by weight styrene are preferred.

Another advantage of the present invention is that when the above-mentioned elastomer is produced as an emulsion polymer, the particle size of the elastomer particles is not nearly so critical as it is in the case of polybutadiene or styrene-butadiene rubber. For instance, polybutadiene or styrene-butadiene elastomers for use in polyvinyl chloride resin blends of good transparency apparently must include 80% by weight of particles of less than 0.2 micron diameter. However, when the elastomer of this invention is employed, a polyvinyl chloride resin composition having good transparency can be obtained even if about 50% of the particles thereof have particle sizes larger than 0.2 micron.

DESCRIPTION OF PREFERRED EMBODIMENTS

Figure 2:
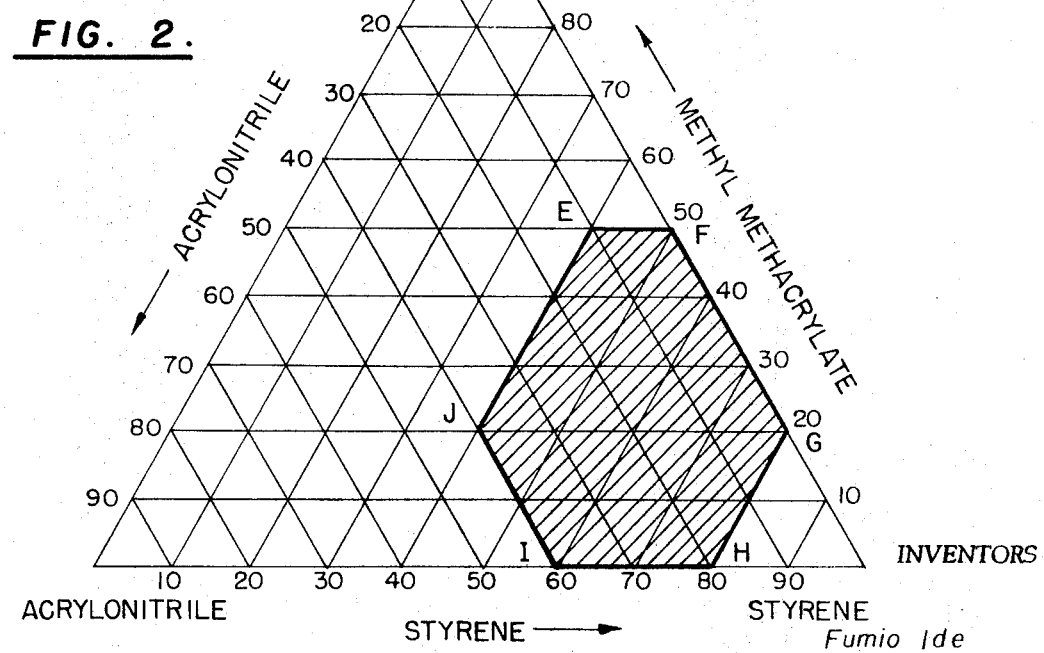
FIG. 2 is a ternary constitutional diagram of a copolymerizate of styrene and methyl methacrylate and/or acrylonitrile.

It is preferred that the resinous additive be prepared by polymerizing about 30 to about 80 parts by weight of a monomer mixture in accordance with FIG. 2 in an emulsion system in the presence of about 20 to about 70 parts by weight of emulsified, preformed elastomer having a composition as shown in FIG. 1 under conditions favoring the formation of a graft polymer in which the backbone is the elastomer and the copolymerizate of styrene and methyl methacrylate and/or acrylonitrile is at least in part in the form of side chains attached to the backbone, since the best impact resistance is attained thereby.

However, very good impact resistance can be obtained also by preparing a portion (e.g. up to 70% by weight) of the copolymerizate out of the presence of the elastomer and the remainder thereof in the presence of the elastomer. For instance, about 75 to about 10 parts by weight of a monomer mixture in accordance with FIG. 2 can be polymerized to a copolymerizate in the presence of about 20 to about 70 parts by weight of emulsified preformed elastomer having a composition as shown in FIG. 1. The resultant graft polymer is mixed with about 5 to about 55 parts by weight of separately prepared copolymerizate having composition in accordance with FIG. 2, so that the total copolymerizate including both that which is produced in the presence of the elastomer and that which is produced separately, constitutes about 30 to about 80 parts by weight of the resultant mixture. The elastomer, the copolymerizate produced in its presence and the separately produced copolymerizate are all preferably produced by emulsion copolymerization, with the above mentioned monomer mixture being introduced along with the requisite emulsifier, initiator and other desired polymerization additives into a latex of the elastomer. After polymerization of the monomers in the latex, the resultant latex can be mixed with a latex of the separately formed copolymerizate and then coagulated, which is preferred, or the precoagulated latexes may be mixed in the solid state in any suitable equipment.

If a high level of low-temperature impact resistance is not required in the PVC blends which are to be prepared, the elastomer and the copolymerizate in the resinous additive can be prepared entirely separately from one another. Here again, the elastomer and the copolymerizate may be mixed in latex form and then coagulated, or they may be mixed in the solid state.

When preparing the elastomer and copolymerizate by emulsion polymerization, any of the known emulsifiers, initiators-chain transfer agents and other additives may be employed in a manner and in amounts known to the art. For instance, as the polymerization initiator one may use ammonium persulfate, potassium persulfate, hydrogen peroxide, cumene hydroperoxide, p-menthane hydroperoxide, and the like. The emulsifier may be any anionic surface active agent such as a salt of an aliphatic acid, an alkyl sulfate, an alkyl sulfonate, an alkyl aryl sulfonate, and the like or a nonionic surface active agent such as a monoglyceride of an aliphatic acid, an alkylether of a polyethylene glycol, an aliphatic acid ester of polyethylene glycol, and the like. Mixtures of such surface active agents may also be used.

Regardless of how it is prepared, the resinous additive must contain at least about 20% by weight of the elastomer. Otherwise, the vinyl chloride polymer compositions prepared therefrom will be found excellent in moldability and transparency but poor in impact strength. On the other hand, if the elastomer constitutes more than about 70% by weight of the resinous additive, the vinyl chloride polymer compositions prepared therefrom will be found poor in rigidity and surface properties. The optimum level of elastomer content is considered to be about 40–60% by weight in both cases.

The vinyl chloride polymer used in this invention may be prepared by a conventional emulsion polymerization, suspension polymerization or bulk polymerization. Preferably, it has a refractive index ($n_D^{25}$) of 1.525–1.550.

The vinyl chloride polymer compositions of this invention are prepared by mixing about 3–40 parts by weight of the resinous additive and about 60–97 parts by weight of vinyl chloride polymer.

If less than 3 parts by weight of resinous additive are used, the addition thereof gives almost no effect, while if more than 40 parts by weight are used, various worthwhile properties of the vinyl chloride polymer (other than transparency) are degraded. Hence, the addition of such a larger amount is uneconomical. It is considered optimum to employ in the compositions of this invention about 10–30 parts by weight of the resinous additive and about 70–90 parts by weight of the vinyl chloride polymer.

The resinous additive is mixed with the vinyl chloride polymer, e.g. polyvinyl chloride resin, by any conventional mixing procedure. For example, they may be mixed in a solid state on a roll mill, a Banbury Mill, a plastograph, a compounding extruder, or the like. If necessary, they may be pre-mixed by means of a ribbon blender or a Henschel mixer. Furthermore, the resinous additive may be mixed with the vinyl chloride polymer with each in latex form. Moreover, when mixing the above components, additives such as stabilizers, plasticizers, lubricants, pigments, fillers and the like may be incorporated in the mixture.

In this specification and in the appended claims, the terms butadiene-1,3, styrene, methyl methacrylate, and acrylonitrile are intended to embrace the compounds themselves and their equivalents. "Methyl methacrylate" may for instance be regarded as including also ethyl methacrylate and the like. However, the use of n-butyl acrylate in the elastomer appears critical, since when other acrylic esters are used in this portion of the resinous additive, it has not been found possible to obtain resinous compositions of excellent transparency and excellent impact resistance by mixing them with vinyl chloride polymers. Monomers, polymers and materials other than those specifically mentioned herein and in the appended claims may be included in the vinyl chloride polymer, resinous additive, elastomer and copolymerizate of the present invention so long as they do not detract seriously from the impact strength and transparency of the resultant compositions, and that is the sense in which the terminology "consisting essentially of" is used herein.

EXAMPLES

The invention is illustrated in part by the following examples, which are given for the purpose of showing several ways in which the invention may be practiced and not for the purpose of limiting the invention. In the examples, "part" and "percent" mean "part by weight" and "percent by weight" respectively.

Examples 1–3

Synthesis of elastomer (E–1):

| | Parts |
|---|---|
| 1,3-butadiene | 57 |
| n-Butyl acrylate | 10 |
| Styrene | 33 |
| Potassium oleate | 2 |
| Potassium persulfate | 0.3 |
| n-Lauryl mercaptan | 0.4 |
| Deionized water | 200 |

The above mixture was charged to an autoclave and after purging the latter with nitrogen, the charge was polymerized for 15 hours at 55° C. with stirring to provide the elastomer (E–1) in a yield of 98% based on the monomers charged.

Preparation of graft polymer (G–1):

| | Parts |
|---|---|
| Elastomer E–1 | a 40 |
| Styrene | 36 |
| Acrylonitrile | 12 |
| Methyl methacrylate | 12 |
| Potassium persulfate | 0.18 |
| n-Lauryl mercaptan | 0.1 |
| Deionized water | 200 | a By solids content.

The above mixture was reacted for 4 hours at 60° C. to provide a graft polymer latex (conversion 98%). The resultant latex was coagulated with an aqueous 0.2% sulfuric acid solution, washed with hot water, and dried to a white powdery graft polymer (G–1). Employing the mixing ratio of graft polymer to polyvinyl chloride. Geon 103 EP–8, a trade name of Nippon Geon Co.) shown in Table 1, portions of the graft polymer were mixed with 2 parts of dibutyltin maleate, 0.5 part of dibutyltin laurate and 0.5 part of butyl stearate per 100 parts of polyvinyl chloride and each of the resulting mixtures was kneaded for 5 minutes at 160° C. on a roll mill, molded into sheet, and the sheet was press-molded for 10 minutes at 180° C. at a pressure of 200 kg./sq. cm. to provide test specimens. The properties of the test specimens are shown in Table 1.

As is clear from the results shown in Table 1, the vinyl chloride resin compositions prepared in accordance with the present invention are superior in both impact strength and transparency to those in the comparative examples.

Examples 4–9

Elastomers (average particle size 0.12 micron) having the compositions shown in Table 2 where prepared and in the presence of 40 parts of each of the elastomers, a monomer mixture consisting of 36 parts of styrene, 12 parts of methyl methacrylate, and 12 parts of acrylonitrile was grafted to provide a series of graft polymers. Each graft polymer thus obtained was mixed with polyvinyl chloride in a ratio shown in Table 2 to prepare resin compositions and the impact strength and luminous transmittance thereof were measured, the results of which are shown in Table 2. At the same time, for comparison, comparative resin compositions were prepared using elastomers having other compositions than those included in the area defined by the quadrilateral ABCD shown in the ternary constitutional diagram of FIG. 1 and their properties are shown in Table 2.

TABLE 2

| | Elastomer composition (percent) | | | Position in the diagram | Properties of the PVC composition | | |
|---|---|---|---|---|---|---|---|
| | Bd | BA | St | | PVC/graft polymer composition | Impact strength (kg.-cm./cm.²) | Total luminous transmittance (percent) |
| Example 4 | 57 | 10 | 33 | a | 85/15 | 23.6 | 80.3 |
| Example 5 | 57 | 10 | 33 | a | 70/30 | 62.5 | 74.1 |
| Example 6 | 45 | 12 | 43 | b | 85/15 | 21.6 | 78.3 |
| Example 7 | 45 | 12 | 43 | b | 70/30 | 54.8 | 71.5 |
| Example 8 | 40 | 20 | 40 | c | 85/15 | 20.5 | 79.4 |
| Example 9 | 40 | 20 | 40 | c | 70/30 | 53.1 | 73.0 |
| Comparative Example 3 | 75 | 0 | 25 | d | 85/15 | 30.6 | 78.2 |
| Comparative Example 4 | 75 | 0 | 25 | d | 70/30 | 61.2 | 61.3 |
| Comparative Example 5 | 100 | 0 | 0 | e | 85/15 | 20.8 | 71.2 |
| Comparative Example 6 | 100 | 0 | 0 | e | 70/30 | 48.6 | 54.6 |
| Comparative Example 7 | 52 | 28 | 20 | f | 85/15 | 21.4 | 63.0 |
| Comparative Example 8 | 52 | 28 | 20 | f | 70/30 | 42.6 | 51.8 |
| Comparative Example 9 | 17 | 33 | 50 | g | 85/15 | 12.3 | 69.0 |
| Comparative Example 10 | 17 | 33 | 50 | g | 70/30 | 21.6 | 55.6 |

NOTE.—Bd: 1,3-butadiene. BA: n-Butyl acrylate. St: Styrene.

As is clear from Table 2, the use of elastomers having compositions defined by points included in the area ABCD in FIG. 1 results in resin compositions having excellent transparency as compared to those prepared with a conventional elastomer such as polybutadiene or styrene-butadiene rubber.

Examples 10–13

Elastomers each having a different average particle diameter were prepared by using a mixture of 57% 1,3-butadiene, 10% n-butyl acrylate, and 33% styrene. In the presence of 40 parts of each of the elastomers, a monomer mixture consisting of 39 parts of styrene, 9 parts of methyl methacrylate, and 12 parts of acrylonitrile was polymerized to provide several graft polymers. Resin compositions were prepared from 20 parts of each graft

TABLE 1

| | PVC/graft polymer composition | Properties of the PVC composition | | | |
|---|---|---|---|---|---|
| | | Impact strength (kg.-cm./cm.²)[1] | Tensile strength (kg./cm.²)[2] | Luminous transmittance (percent)[3] | Haze value (percent)[4] |
| Comparative Example 1 | 100/0 | 2.6 | 621 | 82.4 | 4.2 |
| Example 1 | 90/10 | 13.7 | 590 | 82.0 | 4.6 |
| Example 2 | 80/20 | 28.3 | 453 | 78.3 | 5.1 |
| Example 3 | 70/30 | 62.5 | 392 | 74.0 | 5.9 |
| Comparative Example 2 | 50/50 | 30.6 | 264 | 67.2 | 7.8 |

[1] Measured by a Charpy impact test according to ASTM D256–56 (test specimen: 15 mm. x 90 mm. x 5 mm., V-notched, depth 2 mm.).
[2] Measured according to ASTM D638–58T.
[3] Total luminous transmittance measured according to ASTM D1003–61.
[4] Measured according to ASTM D1003–61.

polymer and 80 parts of polyvinyl chloride. Their luminous transmittance values are shown in Table 3.

For comparison, comparative resin compositions were prepared from 80 parts of polyvinyl chloride and 20 parts of otherwise identical graft polymers prepared by using polybutadiene or styrene butadiene rubber (content of styrene being 23.5%) as the elastomer. Their liminous transmittance values are also shown in Table 3.

tive compositions were inferior in luminous transmittance and impact strength. It should be noted that the PVC compositions of Examples 14 and 20 are comparable in respect to haze value and nearly comparable in respect to impact strength despite the fact that the methyl methacrylate is omitted from the monomers grafted in accordance with Example 20. Accordingly, it should be noted that resin compositions wherein the monomers constitut-

TABLE 3

|  | Elastomer employed | Average particle diameter of the elastomer ($\mu$) | Total luminous transmittance (percent) |
| --- | --- | --- | --- |
| Example 10 | Bd/BA/St-57/10/33 | 0.05 | 78.4 |
| Example 11 | Bd/BA/St-57/10/33 | 0.10 | 76.3 |
| Example 12 | Bd/BA/St-57/10/33 | 0.16 | 75.3 |
| Exampel 13 | Bd/BA/St-57/10/33 | 0.20 | 73.6 |
| Comparative Example 11 | Polybutadiene | 0.05 | 70.3 |
| Comparative Example 12 | do | 0.10 | 64.3 |
| Comparative Example 13 | do | 0.16 | 58.0 |
| Comparative Example 14 | do | 0.20 | 45.0 |
| Comparative Example 15 | SBR | 0.05 | 76.9 |
| Comparative Example 16 | SBR | 0.10 | 72.8 |
| Comparative Example 17 | SBR | 0.16 | 69.6 |
| Comparative Example 18 | SBR | 0.20 | 62.1 |

As is clear from Table 3, when polybutadiene or styrene-butadiene rubber was employed as the elastomer, the transparency of the resin composition was largely influenced by the particle diameter of the elastomer. That is, when polybutadiene was employed, the transparency of the resin composition prepared therefrom was appreciably reduced when the particle diameter thereof was larger than 0.1 micron. Also, when styrene-butadiene rubber was employed, the transparency of the composition was appreciably reduced when the particle diameter was larger than 0.16 micron. On the other hand, when the elastomer having the composition defined by the present invention was employed, the transparency of the resin composition was less affected by the particle diameter of the elastomer and compositions having good transparency were obtained.

ing the copolymerizate (B) consist essentially of 60–75% by weight styrene and 25–40% by weight acrylonitrile are contemplated for use in the invention.

TABLE 4

|  | Monomers grafted (percent) | | | Properties of the PVC composition | | |
| --- | --- | --- | --- | --- | --- | --- |
|  | St | MMA | AN | Impact strength (kg.-cm./cm.$^2$) | Luminous transmittance (percent) | Haze value (percent) |
| Example 14 | 65 | 15 | 20 | 38.4 | 78.3 | 3.1 |
| Example 15 | 50 | 30 | 20 | 31.6 | 78.0 | 4.2 |
| Example 16 | 45 | 25 | 30 | 30.7 | 76.2 | 6.7 |
| Example 17 | 70 | 10 | 20 | 36.2 | 79.0 | 6.5 |
| Example 18 | 75 | 5 | 20 | 35.2 | 78.2 | 5.0 |
| Example 19 | 60 | 30 | 10 | 46.0 | 77.7 | 6.1 |
| Example 20 | 65 | 0 | 35 | 36.4 | 78.9 | 3.0 |
| Comparative Example 19 | 10 | 80 | 10 | 11.6 | 59.6 | 24.6 |
| Comparative Example 20 | 30 | 20 | 50 | 12.4 | 64.3 | 19.4 |
| Comparative Example 21 | 85 | 0 | 15 | 10.4 | 66.2 | 15.1 |

NOTE.—MMA=Methyl methacrylate; AN=Acrylonitrile.

Examples 14–20

Several graft polymers were prepared by grafting onto 40 parts of an elastomer of 57% 1,3-butadiene, 10% n-butyl acrylate, and 33% styrene, 60 parts of various monomer mixtures having the compositions shown in Table 4. From 20 parts of each resultant graft polymer and 80 parts of polyvinyl chloride were prepared various resin compositions, the properties of which are shown in Table 4. The conditions for preparing the graft polymers were the same as in Example 1. Comparative resin compositions were prepared using graft polymers obtained by grafting with monomer mixtures having compositions outside the range of the present invention and their properties are also shown in Table 4. The results show that the compara- Example 21

A graft polymer was prepared by grafting 40 parts of an elastomer of 53% 1,3-butadiene, 15% n-butyl acrylate and 32% styrene with a monomeric mixture of 30 parts of styrene, 15 parts of methyl methacrylate, and 15 parts of acrylonitrile. From 10 parts of the graft polymer thus obtained and 90 parts of a copolymer of 90% vinyl chloride and 10% vinyl acetate was prepared a resin composition. The impact strength and the total luminous transmittance of the composition were 14.2 kg.-cm./sq. cm. and 77.8% respectively.

Examples 22–25

Several graft polymers were prepared by grafting onto 55 parts of an elastomer of 60% 1,3-butadiene, 10% n-butyl acrylate and 30% styrene, X (variable) parts of a copolymerizate of 60% styrene, 20% methyl methacrylate and 20% acrylonitrile. They were mixed with Y (variable) parts of the copolymer (intrinsic viscosity [$\eta$] measured in dimethyl formamide at 25° C. was 0.94) prepared by polymerizing in emulsion system monomer mixtures having the composition of 60% styrene, 20% methyl methacrylate and 20% acrylonitrile so that the whole parts (X+Y) of the copolymer in the mixture was 45 parts.

From 12 parts of each mixture and 88 parts of polyvinyl chloride (polymerization degree 750-average) were prepared various resin compositions, the properties of which are shown in Table 5.

TABLE 5

| | | Properties of the PVC composition | |
|---|---|---|---|
| | X/Y | Impact strength (kg.-cm./cm.²) | Luminous transmittance (percent) |
| Example 22 | 45/0 | 27.1 | 78.4 |
| Example 23 | 35/10 | 25.6 | 77.6 |
| Example 24 | 22.5/22.5 | 23.2 | 77.0 |
| Example 25 | 31.5/13.5 | 14.8 | 76.3 |

What is claimed is:

1. A resin composition consisting essentially of about 3 to about 40 parts by weight of (I) a resinous additive of about 20 to about 70 parts by weight of (A) an elastomer of about 30–75% by weight 1,3-butadiene, about 5–30% by weight n-butyl acrylate, and about 20–50% by weight styrene in a weight ratio defined by a point in the area ABCD in FIG. 1 and about 30 to about 80 parts by weight of (B) a copolymerizate of about 40–80% by weight styrene, about 0–50% by weight methyl methacrylate, and about 0–40% by weight acrylonitrile in a weight ratio defined by a point in the area EFGHIJ in FIG. 2 and about 60 to about 97 parts by weight of (II) a vinyl chloride polymer.

2. The resin composition of claim 1 wherein said resinous additive (I) is prepared by polymerizing the monomers constituting said copolymerizate (B) in the presence of said elastomer (A).

3. The resin composition of claim 2 wherein said elastomer (A) is a terpolymer consisting essentially of 55–60% by weight 1,3-butadiene, 8–13% by weight n-butyl acrylate, and 30–38% by weight styrene.

4. The resin composition of claim 2 wherein said monomers constituting said copolymerizate (B) is a copolymer consisting essentially of 60–75% by weight styrene and 25–40% by weight acrylonitrile.

5. The resin composition of claim 1 wherein said resin (II) is a copolymer consisting essentially of 70–97% by weight vinyl chloride and 3–30% by weight vinyl acetate.

6. The resin composition of claim 1 wherein the copolymerizate (B) includes a first portion ($B_1$) of about 75 to about 10 parts by weight of said copolymerizate which has been polymerized in the presence of said elastomer and a second portion ($B_2$) of about 5 to about 55 parts by weight of said copolymerizate which has been polymerized separately from said elastomer, the total of said first and second portions ($B_1+B_2$) being about 30 to about 80 parts by weight.

References Cited

UNITED STATES PATENTS

| 2,753,322 | 7/1956 | Parks et al. | 260—891X |
| 2,808,387 | 10/1957 | Parks et al. | 260—891X |
| 3,018,268 | 1/1962 | Daly | 260—876X |
| 3,283,034 | 11/1966 | Urbanic | 260—891X |

FOREIGN PATENTS

| 960,868 | 6/1964 | Great Britain | 260—891 |
| 547,789 | 10/1957 | Canada | 260—890 |
| 739,035 | 7/1966 | Canada | 260—891 |

MURRAY TILLMAN, Primary Examiner

H. ROBERTS, Assistant Examiner

U.S. Cl. X.R.

260—890, 891